(12) United States Patent
Manghi et al.

(10) Patent No.: US 10,289,337 B1
(45) Date of Patent: May 14, 2019

(54) ORIENTATION-BASED DATA TRANSFER

(71) Applicant: Western Digital Technologies, Inc., Irvine, CA (US)

(72) Inventors: Ameen Manghi, Santa Ana, CA (US); Eric W. Chang, Irvine, CA (US); Maria Nzembi Kala, Aliso Viejo, CA (US); Saurabh Agarwal, Irvine, CA (US); Muhammad Zeeshan Razzaque, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 134 days.

(21) Appl. No.: 14/945,240

(22) Filed: Nov. 18, 2015

(51) Int. Cl.
| | |
|---|---|
| *G06F 17/30* | (2006.01) |
| *G06F 3/0481* | (2013.01) |
| *G06F 3/0488* | (2013.01) |
| *G06F 3/06* | (2006.01) |
| *H04L 29/08* | (2006.01) |
| *H04W 4/02* | (2018.01) |
| *H04W 4/38* | (2018.01) |
| *H04W 4/80* | (2018.01) |

(52) U.S. Cl.
CPC ............ *G06F 3/065* (2013.01); *G06F 3/0488* (2013.01); *G06F 3/04817* (2013.01); *G06F 3/0604* (2013.01); *G06F 3/067* (2013.01); *G06F 3/0688* (2013.01); *G06F 17/30* (2013.01); *H04L 67/06* (2013.01); *H04W 4/026* (2013.01); *H04W 4/38* (2018.02); *H04W 4/80* (2018.02)

(58) Field of Classification Search
CPC ...... G06F 3/065; G06F 3/0688; G06F 3/0604; G06F 3/067; G06F 3/0488; G06F 3/04817; G06F 17/30; H04L 67/06; H04W 4/008; H04W 4/006; H04W 4/026
See application file for complete search history.

(56) References Cited

U.S. PATENT DOCUMENTS

| | | | | | |
|---|---|---|---|---|---|
| 5,438,674 | A | * | 8/1995 | Keele | ............ G06F 3/0601 703/23 |
| 5,455,926 | A | * | 10/1995 | Keele | ............ G06F 3/0601 711/112 |

(Continued)

FOREIGN PATENT DOCUMENTS

DE 3277148 D1 * 10/1987 ........... G11B 23/032

OTHER PUBLICATIONS

Hamlin, "Reed Switch and Reed Sensor Acitivation", 2008, pp. 1-2, https://www.sparkfun.com/datasheets/Components/Buttons/AN104.pdf.*

(Continued)

*Primary Examiner* — Christopher D Birkhimer
(74) *Attorney, Agent, or Firm* — Chang & Hale LLP (57) ABSTRACT

Systems and methods are disclosed for initiating data transfer operations between data storage devices based at least in part on relative physical orientation or position of the data storage devices. Data storage devices are disclosed that include a physical enclosure, a non-volatile memory disposed within the physical enclosure, one or more sensors, and a controller configured to determine a physical orientation of the data storage device relative to another data storage device using the one or more sensors and initiate a data storage operation involving the data storage device and the other data storage device based on the physical orientation.

17 Claims, 5 Drawing Sheets

(56) References Cited

U.S. PATENT DOCUMENTS

| | | | | |
|---|---|---|---|---|
| 5,546,315 | A * | 8/1996 | Kleinschnitz | G06F 3/0601 700/218 |
| 5,742,792 | A * | 4/1998 | Yanai | G06F 3/0601 710/1 |
| 6,081,411 | A * | 6/2000 | Green | G11B 5/7315 360/135 |
| 6,173,377 | B1 * | 1/2001 | Yanai | G06F 3/0601 711/154 |
| 6,502,205 | B1 * | 12/2002 | Yanai | G06F 3/0601 714/6.32 |
| 6,625,705 | B2 * | 9/2003 | Yanai | G06F 3/0601 711/161 |
| 6,647,474 | B2 * | 11/2003 | Yanai | G06F 3/0601 711/161 |
| 7,016,135 | B2 * | 3/2006 | Emberty | G11B 33/12 360/69 |
| 7,055,059 | B2 * | 5/2006 | Yanai | G06F 3/0601 714/6.32 |
| 7,073,090 | B2 * | 7/2006 | Yanai | G06F 3/0601 714/6.31 |
| 7,111,118 | B2 * | 9/2006 | Mereddy | G06F 3/0613 711/112 |
| 7,167,359 | B2 * | 1/2007 | Wendel | G11B 33/08 211/41.17 |
| 7,240,238 | B2 * | 7/2007 | Yanai | G06F 3/0601 714/6.32 |
| 7,280,353 | B2 * | 10/2007 | Wendel | G11B 33/08 361/679.33 |
| 7,319,586 | B2 * | 1/2008 | Hall | G11B 33/08 211/41.17 |
| 7,349,168 | B2 * | 3/2008 | Yasue | G06F 3/0607 360/69 |
| 7,349,205 | B2 * | 3/2008 | Hall | G11B 33/08 349/58 |
| 7,359,188 | B2 * | 4/2008 | Hall | G11B 33/08 361/679.33 |
| 7,391,609 | B2 * | 6/2008 | Hall | G11B 33/08 361/679.33 |
| 7,447,015 | B2 * | 11/2008 | Hall | G11B 33/08 323/282 |
| 7,469,571 | B2 * | 12/2008 | Taguchi | G11B 5/5582 73/11.04 |
| 7,505,264 | B2 * | 3/2009 | Hall | G11B 33/08 360/264.7 |
| 7,626,805 | B2 * | 12/2009 | Hall | G11B 33/08 312/223.4 |
| 7,630,196 | B2 * | 12/2009 | Hall | G11B 33/08 206/707 |
| 7,646,597 | B2 * | 1/2010 | Hall | G11B 33/08 360/97.15 |
| 7,701,700 | B2 * | 4/2010 | Hall | G11B 33/08 211/26 |
| 7,701,705 | B1 | 4/2010 | Szeremeta | |
| 7,702,830 | B2 * | 4/2010 | Brunet | G06F 3/0605 710/60 |
| 7,716,440 | B2 * | 5/2010 | Taninaka | G06F 3/0607 707/823 |
| 7,800,894 | B2 * | 9/2010 | Davis | G11B 33/127 361/679.33 |
| 7,813,913 | B2 * | 10/2010 | Collins | G06F 3/0605 703/24 |
| 7,818,160 | B2 * | 10/2010 | Collins | G06F 3/0605 703/24 |
| 7,899,662 | B2 * | 3/2011 | Brunet | G06F 3/0605 703/23 |
| 8,064,194 | B2 | 11/2011 | Szeremeta | |
| 8,113,873 | B1 | 2/2012 | Sarraf | |
| 8,116,075 | B2 * | 2/2012 | Hall | G11B 33/08 211/26 |
| 8,133,426 | B1 | 3/2012 | Yurchenco et al. | |
| 8,195,445 | B2 * | 6/2012 | Brunet | G06F 3/0605 703/23 |
| 8,214,611 | B2 * | 7/2012 | Amano | G06F 3/0613 707/654 |
| 8,358,395 | B1 | 1/2013 | Szeremeta | |
| 8,417,979 | B2 | 4/2013 | Maroney | |
| 8,462,460 | B1 | 6/2013 | Szeremeta et al. | |
| 8,498,088 | B1 | 7/2013 | Klein | |
| 8,547,658 | B1 | 10/2013 | Szeremeta | |
| 8,574,046 | B2 * | 11/2013 | Nishiyama | G06F 1/187 165/104.34 |
| 8,654,367 | B2 * | 2/2014 | Funane | G06F 3/0619 358/1.1 |
| 8,922,824 | B2 * | 12/2014 | Funane | G06F 3/0619 358/1.1 |
| 8,923,760 | B2 | 12/2014 | Iwasaki | |
| 8,989,053 | B1 * | 3/2015 | Skaaksrud | H04W 12/06 370/255 |
| 9,013,867 | B2 * | 4/2015 | Becze | G06F 3/1438 361/679.01 |
| 9,026,751 | B2 * | 5/2015 | Irisawa | G06F 3/0605 711/162 |
| 9,043,571 | B2 * | 5/2015 | Matsuya | G06F 12/02 711/114 |
| 9,086,835 | B2 * | 7/2015 | Becze | G06F 3/1438 |
| 9,086,836 | B2 * | 7/2015 | Becze | G06F 3/1438 |
| 9,116,655 | B2 * | 8/2015 | Becze | G06F 3/1438 |
| 9,176,701 | B2 * | 11/2015 | Becze | G06F 3/1438 |
| 9,182,231 | B2 * | 11/2015 | Skaaksrud | H04W 12/06 |
| 9,182,232 | B2 * | 11/2015 | Skaaksrud | H04W 12/06 |
| 2002/0019950 | A1 * | 2/2002 | Huffman | G06F 1/1616 713/300 |
| 2002/0194442 | A1 * | 12/2002 | Yanai | G06F 3/0601 711/162 |
| 2003/0005355 | A1 * | 1/2003 | Yanai | G06F 3/0601 714/5.11 |
| 2003/0007277 | A1 * | 1/2003 | Emberty | G11B 33/12 360/69 |
| 2003/0014674 | A1 * | 1/2003 | Huffman | G06F 1/1616 713/300 |
| 2003/0167419 | A1 * | 9/2003 | Yanai | G06F 3/0601 714/6.31 |
| 2004/0073831 | A1 * | 4/2004 | Yanai | G06F 3/0601 714/6.32 |
| 2005/0071559 | A1 * | 3/2005 | Tamura | G06F 3/0607 711/117 |
| 2005/0080990 | A1 * | 4/2005 | Mereddy | G06F 3/0613 711/114 |
| 2005/0168934 | A1 * | 8/2005 | Wendel | G11B 33/08 361/679.36 |
| 2005/0185374 | A1 * | 8/2005 | Wendel | G11B 33/08 361/679.33 |
| 2006/0005074 | A1 * | 1/2006 | Yanai | G06F 3/0601 714/6.32 |
| 2006/0152841 | A1 * | 7/2006 | Yasue | G06F 3/0607 360/69 |
| 2007/0030640 | A1 * | 2/2007 | Hall | G11B 33/08 361/679.34 |
| 2007/0030641 | A1 * | 2/2007 | Hall | G11B 33/08 361/679.33 |
| 2007/0030642 | A1 * | 2/2007 | Hall | G11B 33/08 361/679.33 |
| 2007/0030643 | A1 * | 2/2007 | Hall | G11B 33/08 361/679.34 |
| 2007/0030644 | A1 * | 2/2007 | Hall | G11B 33/08 361/679.32 |
| 2007/0035873 | A1 * | 2/2007 | Hall | G11B 33/08 360/97.15 |
| 2007/0035874 | A1 * | 2/2007 | Wendel | G11B 33/08 360/97.15 |
| 2007/0035875 | A1 * | 2/2007 | Hall | G11B 33/08 360/97.15 |
| 2007/0035879 | A1 * | 2/2007 | Hall | G11B 33/08 360/137 |
| 2007/0035880 | A1 * | 2/2007 | Hall | G11B 33/08 360/137 |

(56) References Cited

U.S. PATENT DOCUMENTS

| | | | |
|---|---|---|---|
| 2007/0083354 A1* | 4/2007 | Collins | G06F 3/0605 703/23 |
| 2007/0083355 A1* | 4/2007 | Collins | G06F 3/0605 703/23 |
| 2007/0083356 A1* | 4/2007 | Brunet | G06F 3/0605 703/23 |
| 2007/0125151 A1* | 6/2007 | Taguchi | G11B 5/5582 73/11.04 |
| 2007/0143096 A1* | 6/2007 | Brunet | G06F 3/0605 703/23 |
| 2010/0082925 A1* | 4/2010 | Irisawa | G06F 3/0605 711/162 |
| 2010/0121921 A1 | 5/2010 | Dunton | |
| 2010/0169560 A1* | 7/2010 | Brunet | G06F 3/0605 711/103 |
| 2010/0260024 A1* | 10/2010 | Wendel | G11B 33/08 369/53.42 |
| 2011/0004459 A1* | 1/2011 | Collins | G06F 3/0605 703/24 |
| 2011/0125980 A1* | 5/2011 | Brunet | G06F 3/0605 711/162 |
| 2011/0134459 A1* | 6/2011 | Funane | G06F 3/0619 358/1.14 |
| 2011/0154014 A1 | 6/2011 | Thorn | |
| 2011/0264877 A1* | 10/2011 | Amano | G06F 3/0613 711/162 |
| 2013/0021696 A1* | 1/2013 | Davis | H05K 7/20772 360/97.13 |
| 2013/0076597 A1* | 3/2013 | Becze | G06F 3/1438 345/1.3 |
| 2013/0077221 A1* | 3/2013 | Becze | G06F 3/1438 361/679.3 |
| 2013/0077236 A1* | 3/2013 | Becze | G06F 3/1438 361/679.56 |
| 2013/0082585 A1* | 4/2013 | Becze | G06F 3/1438 312/223.2 |
| 2013/0082955 A1* | 4/2013 | Becze | G06F 3/1438 345/173 |
| 2013/0083464 A1* | 4/2013 | Becze | G06F 3/1438 361/679.3 |
| 2013/0083466 A1* | 4/2013 | Becze | G06F 3/1438 361/679.27 |
| 2013/0083467 A1* | 4/2013 | Becze | G06F 3/1438 361/679.27 |
| 2013/0083468 A1* | 4/2013 | Becze | G06F 3/1438 361/679.27 |
| 2013/0083469 A1* | 4/2013 | Becze | G06F 3/1438 361/679.27 |
| 2013/0083470 A1* | 4/2013 | Becze | G06F 3/1438 361/679.27 |
| 2013/0083477 A1* | 4/2013 | Becze | G06F 3/1438 361/679.41 |
| 2013/0083558 A1* | 4/2013 | Becze | G06F 3/1438 362/611 |
| 2013/0088447 A1* | 4/2013 | Becze | G06F 3/1438 345/173 |
| 2013/0110974 A1* | 5/2013 | Arrasvuori | H04L 67/18 709/217 |
| 2014/0075143 A1* | 3/2014 | Matsuya | G06F 12/02 711/170 |
| 2014/0123038 A1 | 5/2014 | Ahn et al. | |
| 2014/0126023 A1* | 5/2014 | Funane | G06F 3/0619 358/1.16 |
| 2014/0365743 A1* | 12/2014 | Pronozuk | G06F 3/0623 711/166 |
| 2015/0146353 A1* | 5/2015 | MacNeil | G06F 1/187 361/679.02 |
| 2015/0153175 A1* | 6/2015 | Skaaksrud | H04W 12/06 701/23 |
| 2015/0154370 A1* | 6/2015 | Skaaksrud | H04W 12/06 705/2 |
| 2015/0154431 A1* | 6/2015 | Skaaksrud | H04W 12/06 340/10.1 |
| 2015/0154531 A1* | 6/2015 | Skaaksrud | H04W 12/06 705/14.66 |
| 2015/0154532 A1* | 6/2015 | Skaaksrud | H04W 12/06 705/341 |
| 2015/0154536 A1* | 6/2015 | Skaaksrud | H04W 12/06 235/385 |
| 2015/0154538 A1* | 6/2015 | Skaaksrud | H04W 12/06 705/333 |
| 2015/0154539 A1* | 6/2015 | Skaaksrud | H04W 12/06 705/333 |
| 2015/0154540 A1* | 6/2015 | Skaaksrud | H04W 12/06 705/333 |
| 2015/0154541 A1* | 6/2015 | Skaaksrud | H04W 12/06 705/333 |
| 2015/0154542 A1* | 6/2015 | Skaaksrud | H04W 12/06 705/39 |
| 2015/0154543 A1* | 6/2015 | Skaaksrud | H04W 12/06 705/333 |
| 2015/0154544 A1* | 6/2015 | Skaaksrud | H04W 12/06 705/333 |
| 2015/0154545 A1* | 6/2015 | Skaaksrud | H04W 12/06 705/333 |
| 2015/0154546 A1* | 6/2015 | Skaaksrud | H04W 12/06 705/333 |
| 2015/0154547 A1* | 6/2015 | Skaaksrud | H04W 12/06 705/333 |
| 2015/0154548 A1* | 6/2015 | Skaaksrud | H04W 12/06 705/333 |
| 2015/0154549 A1* | 6/2015 | Skaaksrud | H04W 12/06 705/333 |
| 2015/0154550 A1* | 6/2015 | Skaaksrud | H04W 12/06 705/333 |
| 2015/0154551 A1* | 6/2015 | Skaaksrud | H04W 12/06 705/333 |
| 2015/0154552 A1* | 6/2015 | Skaaksrud | H04W 12/06 705/333 |
| 2015/0154553 A1* | 6/2015 | Skaaksrud | H04W 12/06 705/333 |
| 2015/0154554 A1* | 6/2015 | Skaaksrud | H04W 12/06 705/333 |
| 2015/0154555 A1* | 6/2015 | Skaaksrud | H04W 12/06 705/333 |
| 2015/0154556 A1* | 6/2015 | Skaaksrud | H04W 12/06 705/333 |
| 2015/0154557 A1* | 6/2015 | Skaaksrud | H04W 12/06 705/337 |
| 2015/0154585 A1* | 6/2015 | Skaaksrud | H04W 12/06 705/44 |
| 2015/0154844 A1* | 6/2015 | Skaaksrud | H04W 12/06 340/539.13 |
| 2015/0156066 A1* | 6/2015 | Skaaksrud | H04W 12/06 709/224 |
| 2015/0156100 A1* | 6/2015 | Skaaksrud | H04W 12/06 709/224 |
| 2015/0156109 A1* | 6/2015 | Skaaksrud | H04W 12/06 709/239 |
| 2015/0156253 A1* | 6/2015 | Skaaksrud | H04W 12/06 709/204 |
| 2015/0156254 A1* | 6/2015 | Skaaksrud | H04W 12/06 709/223 |
| 2015/0156605 A1* | 6/2015 | Skaaksrud | H04W 12/06 455/456.1 |
| 2015/0156627 A1* | 6/2015 | Skaaksrud | H04W 12/06 370/328 |
| 2015/0156718 A1* | 6/2015 | Skaaksrud | H04W 12/06 370/311 |
| 2015/0198985 A1* | 7/2015 | Ringuette | G06F 1/187 361/679.33 |
| 2015/0212903 A1* | 7/2015 | Irisawa | G06F 3/0605 707/652 |

(56) References Cited

U.S. PATENT DOCUMENTS

2015/0242154 A1* 8/2015 Yang ................ G06F 11/14
                                                    711/115
2015/0319243 A1* 11/2015 Hussain ............. G06F 3/065
                                                    709/217

OTHER PUBLICATIONS

Oki, "Reed Switch Databook", Sep. 2010, pp. 1-180, https://www.reed-rex.com/image/catalog/PDF/OKI_Reed_Switch_Databook.pdf.*

Oki, "Reed Switch Basics", 2015, pp. 1-31, https://www.reed-rex.com/image/catalog/PDF/Reed-Switch-Basics-(2015).pptx.*

Standex, "Reed Sensors & Magnets: Introduction", Sep. 14, 2015, pp. 1-3, https://web.archive.org/web/20150914173922/https://standexelectronics.com/products/reed-sensors-magnets/.*

Anonymous, "Reed Switches", Oct. 1, 2009, pp. 1-5, https://web.archive.org/web/20091001210424/http://www.explainthatstuff.com/howreedswitcheswork.html.*

NetApp, "Resizing Volumes", 2014, pp. 1-2, https://library.netapp.com/ecmdocs/ECMP1354558/html/GUID-C04C2C72-FF1F-4240-A22D-BE20BB74A116.html.*

Webopedia, "DAS—Direct Attached Storage", Jan. 22, 2014, pp. 1-3, https://web.archive.org/web/20140122075549/https://www.webopedia.com/TERM/D/direct_attached_storage.html (Year: 2014).*

\* cited by examiner

ORIENTATION-BASED DATA TRANSFER

BACKGROUND

Data transfer among data storage devices can be performed in various ways. A host device may generally control connection and/or transfer of data between data storage devices.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to data transfer between data storage devices without host management.

Overview

Transferring data from one data storage media to another may generally require multiple distinct hosts with which the respective individual data storage devices communicate with over a physical interface. However, such systems may require undesirable/cumbersome user interaction to achieve the desired physical connection or communication channel, as well as the needed host processing. For example, connecting data storage devices to one or more hosts for the purpose of managing data transfer between the devices can be an undesirably time-consuming process, and may require that the user(s) have the appropriate connection cables/tools at the time of transfer.

Certain embodiments disclosed herein provide for data transfer between data storage devices/drives substantially without the necessity of a separate host manager device, wherein the system may use the relative placement and/or orientation of separate external storage devices/drives to determine what kind of operation the user intends to perform. Such solutions may provide for reduced set-up complexity compared to systems requiring the presence of one or more host devices with associated software to facilitate the data transfer operation. The terms "data storage device" and "data storage drive" are used herein according to their broad and/or ordinary meaning any may be used substantially interchangeably in certain contexts herein.

The solutions presented herein may provide for simplified data transfer compared to certain alternative systems. For example, one use case may involve a user who uses a portable data storage drive as a primary storage drive for storing certain data, but wishes to periodically back-up the data to a backup drive. According to an embodiment of the present disclosure, rather than having to connect the primary drive and the backup drive to one or more host devices (e.g., using USB cable(s) or other connection protocol), the user may instead initiate direct drive-to-drive backup transfer with relatively minimal user input and without drive-to-host connections. For example, the user may initiate drive-to-drive transfer simply by pressing a transfer initiation button on one of the drives and placing the drives in a particular relative physical orientation. The controller(s) of one or more of the drives may recognize the physical orientation using various sensors and/or sensor targets associated with one or more of the drives, and execute a particular type of drive-to-drive data transfer based on the physical orientation.

Data Transfer System

Figure 1:
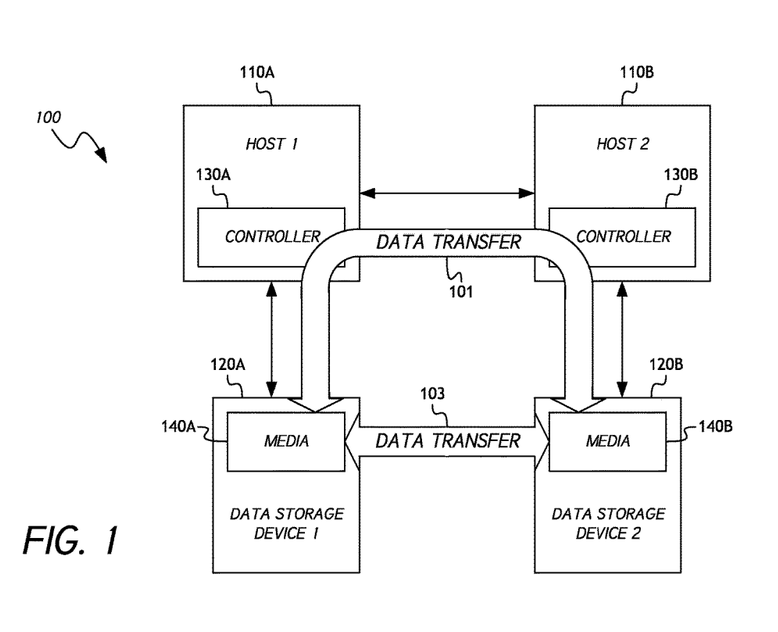
FIG. 1 is a block diagram of a data transfer system according to one or more embodiments.

FIG. 1 is a block diagram illustrating an embodiment of a data storage management system 100. The data storage management system 100 includes a first data storage device 120A and a second data storage device 120B, wherein each of the data storage devices comprises data storage media (140A, 140B, respectively). In certain situations, it may be desirable to perform data transfer operations between the respective storage media of the data storage devices 120A, 120B. For example, such data storage operations may include copying, transferring, synchronizing, or otherwise exchanging data from one data storage device to the other and/or vice versa.

In the system 100, the data storage device 120A is coupled to a host device or system 110A, wherein the host 110A may comprise a controller 130A configured to execute data storage access commands with the data storage device 120A over a communications interface. For example, the data storage device 120A may be an internal mass storage device associated with the host computer 110A, or may be an external data storage device coupled to the host 110A over a wired or wireless connection. The second data storage device 120B may likewise be coupled to a host device or system 110B, having a controller 130B configured to direct operation of the host 110B. For example, the controller 130B may be configured to execute data storage access commands in the data storage device 120B.

In order to execute data transfer operations between the media 140A of the first data storage device 120A and the media 140B of the second data storage device 120B, the system 100 may require that one or more of the controllers 130A, 130B utilized to manage the first and second data storage devices 120A, 120B, manage the transfer of data between the data storage devices. That is, it may be necessary in certain embodiments for one or more host systems or devices to be utilized for the purposes of executing data transfer commands where the one or more data storage devices 120A, 120B do not comprise sufficient controller functionality for implementing data transfer directly without direction from a host controller.

With the assistance of one or more of the controllers 130A, 130B, the system 100 may allow for data transfer between the data storage device 120A and the data storage device 120B. Such data transfer may be achieved over any desirable or practical data communication path. For example, in an embodiment, data transfer between media 140A and media 140B may follow a data path 101 through one or more of the controllers 130A, 130B of the first host device 110A and the second house device 110B. For example, the host 110A may read data from the media 140A of the data storage device 120A and provide the data to the second host 110B, with which the first host 110A has a data communication channel. The second host 110B may further transfer data to the couple data storage device 120B.

Alternatively, data transfer between the storage devices 120A, 120B may be achieved over a direct communication path 103 between the data storage devices, such as a wired or wireless pairing between the data storage device 120A and the data storage device 120B and/or the media 140A and the media 140B. That is, while the controller 130A and/or controller 130B may be utilized to at least partially direct the data transfer between the first storage device 120A and the second storage device 120B, the communication channel over which data transfer may occur may be a direct channel between the first data storage device 120A in the second data storage device 120B. For example, the data transfer path 103 may comprise a wired or wireless peer-to-peer data communication channel between the data storage device 120A and the data storage device 120B, such as a WiFi, Bluetooth, Ethernet, or other data transmission protocol.

Figure 2:
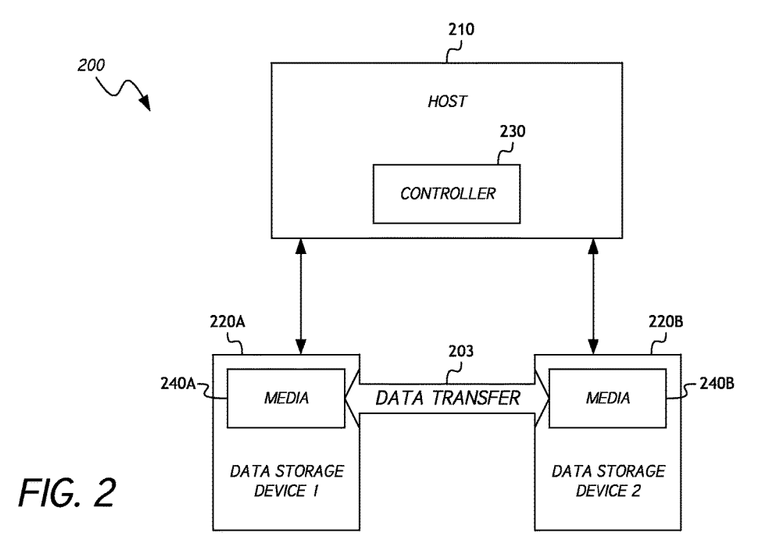
FIG. 2 is a block diagram of a data transfer system according to one or more embodiments.

FIG. 2 illustrates a computing system 200 including a host device or system 210 communicatively coupled to a plurality of data storage devices, such as data storage device 220A and data storage device 220B, as shown in the diagram. Similarly to the diagram of FIG. 1, the system 200 of FIG. 2 may be configured to facilitate data transfer between the first data storage device 220A and the second storage device 220B, wherein the first data storage device 220A comprises data storage media 240A, and the second data storage device 220 B comprises data storage media 240B.

Although data transfer is illustrated as taking place over the communication channel 203 between the first data storage device 220A and the second data storage device 220B, in certain embodiments, execution of such data transfer may require direction by a controller 230 of the host 210 to coordinate data transfer commands between the storage devices. For example, the two data storage devices 220A, 220B may be connected locally to a single host device 210, wherein the controller 230 of the host 210 may provide concentric host management of data transfer between the data storage devices 220A, 220B.

Figure 3:
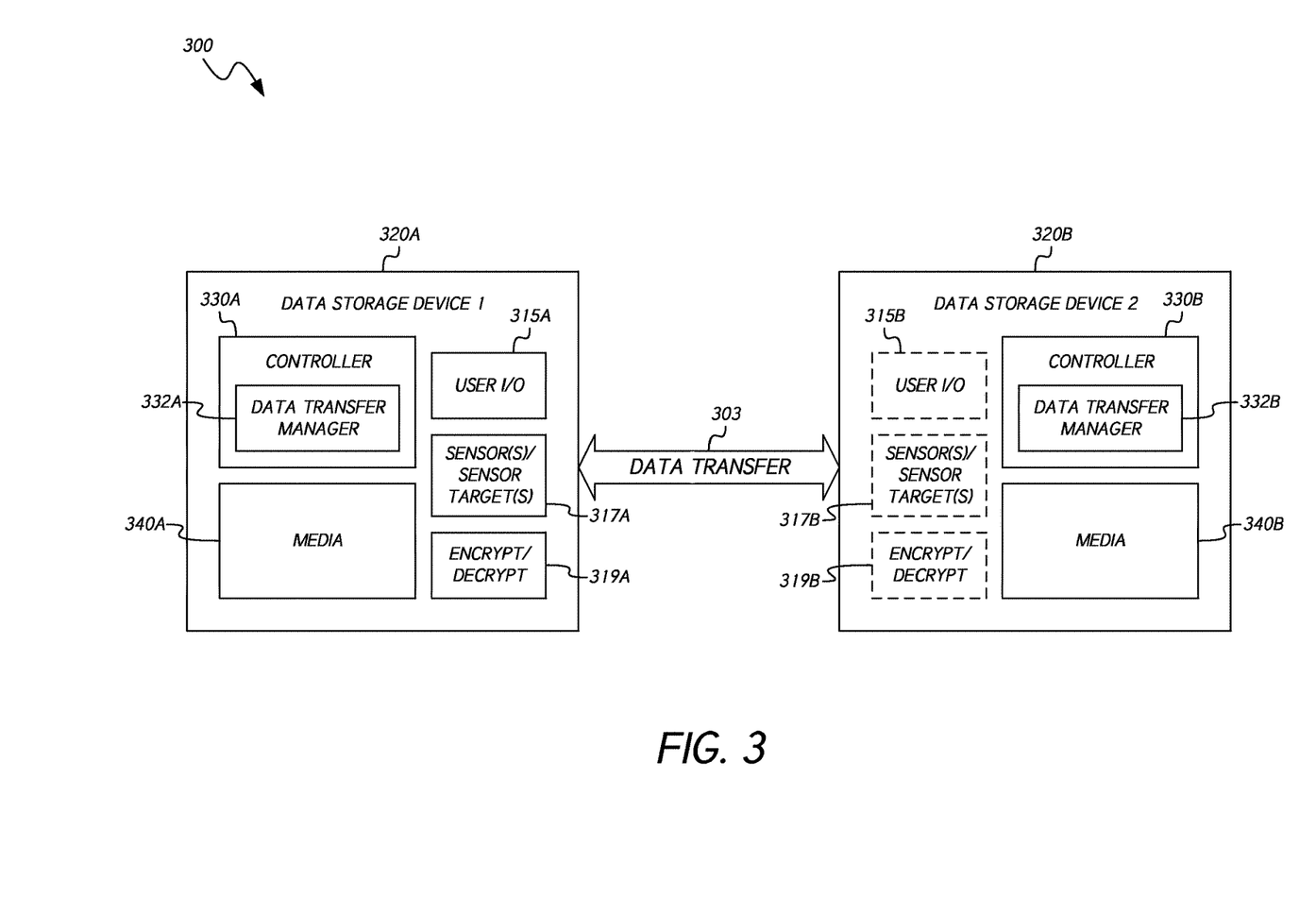
FIG. 3 is a block diagram of a data transfer system according to one or more embodiments.

Certain embodiments disclosed herein provide for relatively seamless, simple data transfer between separate data storage drives/devices without requiring a separate transfer management host. FIG. 3 is a block diagram illustrating a computing system 300 including a first data storage device 320A and a second data storage device 320B. In certain embodiments, the first data storage device 320A and second data storage device 320B may be configured to perform data transfer operations between the two devices substantially without assistance from an external host device or system, which may provide reduced system complexity and/or improved ease of use, among possibly other benefits.

The system 300 may be configured to implement wireless drive-to-drive operations (e.g., copy, synchronization, extend, erase, or other operation(s)) without the necessity of plugging either or both of the devices 320A, 320B into a host machine or using physical connections between the drives. In certain embodiments, the nature of the data transfer operation(s) implemented may be controlled/determined by the relative placement, orientation, and/or proximity of the devices.

The data storage device 320A includes data storage media 340A as well as controller circuitry 330A, which may be configured to perform data transfer functionality with respect to data stored in the media 340A according to principles and embodiments disclosed herein. For example, the controller circuitry 330 may include a data transfer manager module 332A, which may provide functionality at least in part for performing data transfer operations between the data storage device 320A and the second data storage device 320B. For example, the controller 330A may be configured to establish a communications channel 303 between the data storage device 320A and the second data storage device 320B. Such establishment of the communication channel may be performed in response to user input provided by the user input/output module 315A of the data storage device 320A and/or detection/sensing by the data storage device 320A of one or more other data storage devices, such as the second data storage device 320B. Therefore, through the input/output module 315A, initiation of data transfer operations may be possible substantially without host interaction.

The controller 330A may advantageously provide adequate processing/memory capability for execution of a local operating system and/or file system that may allow for the implementation of the data transfer operations disclosed herein. The second data storage device 320B may also include a controller 330B configured to run a local operating system for data transfer operations. Alternatively, in an embodiment, only one of the data storage devices runs a local operating system; the second storage device may be connected to the first operating system over a wired connection, such as a USB connection, and receive management instructions thereby.

In order to facilitate the execution of data transfer operations associated with the media 340A, the data storage device 320A may include encryption/decryption module 319A. Encryption/decryption module 319A may be configured to encrypt data stored on the media 340A prior transmission to the data storage device 320B and/or decrypt data received over the data transfer channel 303 from the data storage device 320B, for processing thereof.

In certain embodiments, in order for the data storage device 320A to be utilized for data transfer, it may be necessary for the device to be unlocked. Therefore, the data storage device 320A may include one or more security input components, such as a fingerprint or other biometric scanner, near-field communication (NFC) badge reader. In certain embodiments, each of the data storage devices 320A, 320B comprises its own security management individual to the device.

In certain embodiments, the data storage device 320B may likewise include controller circuitry 330B, which may be desirable or necessary in order to achieve the communication channel 303 between the first data storage device 320A and the second data storage device 320B. In certain embodiments, the controllers 330A, 330B of the data storage device 320A and the data storage device 320B, respectively, comprise one or more processors and/or memory modules, and may provide relatively low-level processing capability as compared to that of a host computing device to which the data storage devices may otherwise be coupled.

Because the data storage devices 320A, 320B may not be managed by a separate host, user input capability may be somewhat restricted relative to host-managed implementations. Therefore, certain embodiments disclosed herein provide for various mechanisms for user input for data transfer operation control purposes. To such end, the data storage device 320A may utilize the one or more sensors 317A to detect the presence and/or relative orientation of one or more other data storage devices or computing devices, such as the data storage device 320B. In certain embodiments, such detection may be used to determine what type of data transfer operation(s) are desired to be executed between the data storage devices 320A, 320B. The data storage device 320A may further comprise one or more sensor targets (also identified by block 317A in FIG. 3), which may comprise one or more components and/or materials positioned and/or configured to be sensed by a sensor of another data storage device or computing device. In an embodiment, the sensor(s) 317A of the data storage device 320A may be a sensor (e.g., Reed sensor) configured to detect a magnetic field presented by a sensor target of another device.

In certain embodiments, the data storage device 320B likewise includes one or more sensors and/or sensor targets 317B. For example, the one or more sensor targets of the data storage device 320B may provide a mechanism for the first data storage device 320A to sense such sensor targets with the one or more sensors of the data storage device 320A. In certain embodiments, the sensor(s) and/or sensor targets may be mounted at or near a side of a data storage device to determine if another similar device is placed nearby. Based on the detection/determination, the system 300 may allow the user to initiate the operation corresponding to a particular detected orientation.

The second data storage device 320B may further comprise a user input/output module 315 be and/or and encryption/decryption module 319B, which may provide functionality and/or configuration similar to corresponding components of data storage device 320A, for example. The user I/O module 315B may comprise one or more buttons that may be used to initiate the operation desired.

Sensor Location/Operation

Figure 4:
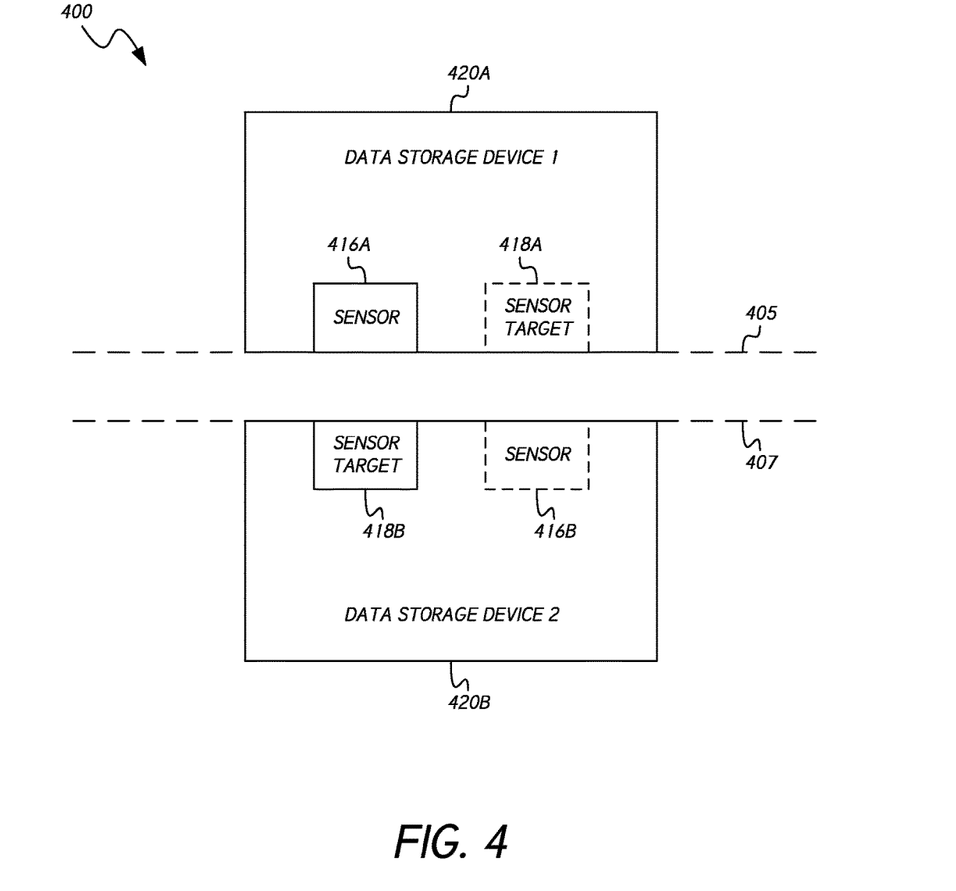
FIG. 4 is a block diagram of a data storage system according to one or more embodiments.

FIG. 4 illustrates a computing system 400 including a first data storage device 420A, which may be disposed adjacent to, or in physical proximity to, a second data storage device 420B. The diagram of FIG. 4 is provided to illustrate one or more embodiments of sensor/sensor target interaction between a plurality of data storage devices according to principles of the present disclosure. The data storage device 420A includes a sensor device 416A, which may be configured to detect the presence of, and/or metadata associated therewith, the second data storage device 420B. For example, the second storage device 420B may comprise a sensor target device or component 418B, which may be detectable in some manner by the sensor 416A of the first data storage device 420A. Sensors and/or sensor targets, as comprised in embodiments disclosed herein, may be any type or configuration of sensors/sensor targets allowing for presence and/or orientation detection. For example, sensors and/or sensor targets in accordance with the present disclosure may include or be associated with one or more of infrared sensors, hall-effect sensors, gyroscopes, accelerometers, GPS sensors, magnetic sensors, or the like.

In certain embodiments, the sensor 416A may be disposed and/or positioned at or in proximity to an enclosure face of the data storage device lying in or about a plane 405. The second data storage device 420B may further have the sensor target 418 be disposed and/or positioned adjacent to or in proximity to an enclosure face or side of the data storage device 420B that lies in or about a plane 407. In certain embodiments, when the first storage device 420A is brought into a position such that the face or side of the device that is in or about the plane 405 comes within a certain range/position with respect to the side and/or portion of the data storage device comprising the sensor target 418B, the sensor 416A may detect the sensor target 418B.

In certain embodiments, the particular sensor target sensed by the sensor 416A may provide information regarding a relative physical orientation between the data storage device 420A and the data storage device 420B. For example, when the sensor 416A detects the sensor target 418B, it may be determined that the data storage device 420A is oriented in such a way that the side of the data storage device associated with the plane 405 is oriented proximal to the side of the data storage device 420B that is proximal to the plane 407, which may be used to describe a relative orientation of the two devices. In certain embodiments, the determined relative orientation between the first and second data storage devices 420A, 420B may be used to determine a type of data transfer operation that is to be executed between the first and second data storage devices 420A, 420B.

In certain embodiments, the second storage device 420B likewise includes a sensor 416B, which may be used to sense the presence of the first storage device 420A, such as by detecting the presence of a sensor target 418A of the data storage device 420A.

In certain embodiments, one or more of the data storage devices 420A, 420B comprises sensors on or near a plurality of major faces of the respective device, where one or more sensor targets (e.g., magnets) may similarly be disposed on corresponding faces of one or more of the data storage devices. In an embodiment, sensors and/or sensor targets are disposed on or near a front face, bottom face, rear face, top face, and/or one or more side faces.

The sensor(s) and sensor target(s) may be used to indicate a relative physical orientation of the two devices, where different relative physical orientations may correspond to different data transfer operation(s). Any type of data transfer operation may be associated with a detected presence or physical orientation. For example, data transfer operations contemplated herein may include at least: a copy operation, where at least a portion of data stored in a media of a first data storage device is copied to a media of a second data storage device; a synchronization operation, wherein a set of data stored on a first data storage device is synchronized with a set of data stored on a second data storage device; and an extend operation, wherein a host is configured to view both storage devices as a single logical volume.

In certain embodiments, physical drive orientation may be used to initiate a data operation without respect to a second data storage drive. For example, a shaking of a data storage drive, as detected using, for example, an accelerometer or the like, may initiate a drive-erase operation. In an embodiment, when the presence of a second drive is detected by a first drive, such detection may initiate an authentication operation to authenticate the second drive with the first drive and/or vice versa.

Storage Device Orientations

Figure 5:
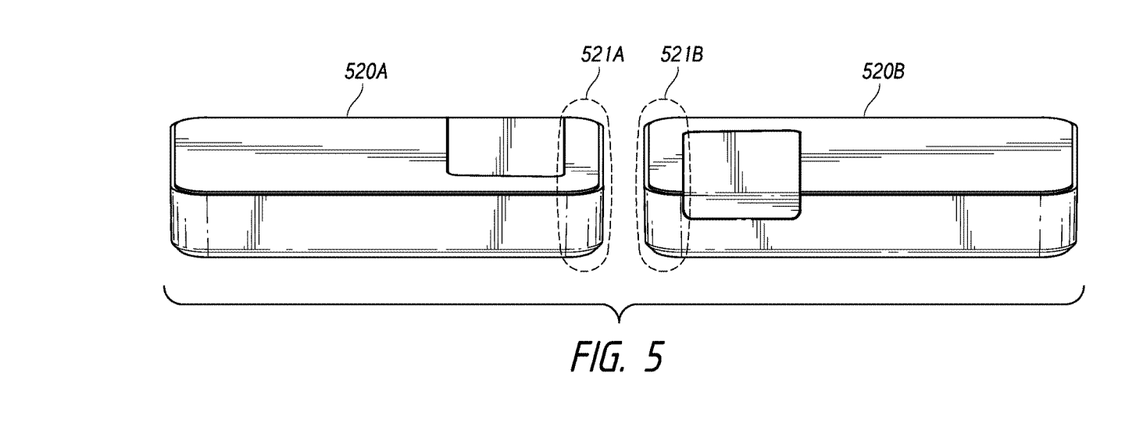
FIG. 5 is a perspective diagram of two data storage devices in a physical orientation according to one or more embodiments.
Figure 6:
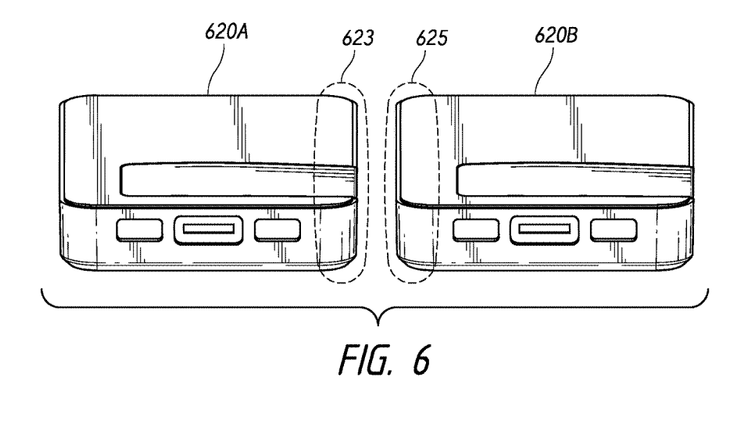
FIG. 6 is a perspective diagram of two data storage devices in a physical orientation according to one or more embodiments.
Figure 7:
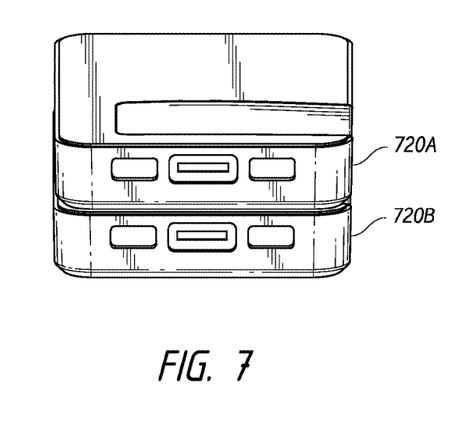
FIG. 7 is a perspective diagram of two data storage devices in a physical orientation according to one or more embodiments.

FIGS. 5-7 illustrate embodiments of data storage devices positioned in various relative physical orientations according to one or more embodiments disclosed herein. In FIG. 5, a first data storage device 520A is illustrated as being positioned such that a front side 521A of the data storage device 520A is adjacent and/or proximate to a corresponding front side 521B of a second data storage device 520B. In certain embodiments, one or more sensors in the data storage device 520A, such as in a region proximate to the front side 521A of the data storage device may be configured to sense one or more sensor target components or devices disposed on or in a housing of the data storage device 520B, such as in proximity to the front side 521B of the data storage device 520B. Therefore, in certain embodiments, when the first and second data storage devices 520A, 520B, are brought into a relative physical orientation like that shown in FIG. 5, control circuitry of one or more of the data storage devices may be configured to identify the particular orientation of the storage devices, and implement one or more data transfer operations based on such orientation. In certain embodiments, it may be necessary for the second storage device 520B to be brought within a sensing range of the one or more sensors of the first data storage device 520A. For example, in certain embodiments, near-field detection is implemented to determine orientation.

The orientation of FIG. 5 may be associated with any desirable or practical data transfer operation(s). For example, in an embodiment, the orientation of FIG. 5, when recognized by one or more sensors/controllers of the data storage device(s), initiates a data copy operation between the first and second data storage devices.

In certain embodiments, physical orientation may be determined in response to user input, such as a signal generated by a button, switch, or the like (not shown), which may be associated with a physical housing or enclosure of the data storage device(s). Requiring user input to initiate the data transfer operation(s) may prevent unwanted data transfer.

FIG. 6 illustrates a side-by-side configuration of data storage devices (620A, 620B). For example, the first data storage device 620A may have one or more sensors disposed within a housing of the device in, or adjacent to, a side region 623 of the data storage device. The second data storage device 620B may further comprise one or more sensor target devices or components disposed within, or proximal to, a corresponding opposite side 625 of the data storage device 620B, such that when the first side 623 of the first storage device 620A comes within a sensing range of the second side 625 of the second storage device 620B, controller circuitry of one or more of the storage devices 620A, 620B may be configured to receive a sensor signal indicating such orientation and perform one or more data transfer operations based on the determined orientation of the data storage devices.

The orientation of FIG. 6 may be associated with any desirable or practical data transfer operation(s). For example, in an embodiment, the orientation of FIG. 6, when recognized by one or more sensors/controllers of the data storage device(s), initiates a data synchronization operation between the first and second data storage devices.

FIG. 7 illustrates a stacked configuration of first and second data storage devices 720A, 720B. Control circuitry of one or more of the data storage devices 720A, 720B, may be configured to receive a sensor signal indicating the stacked orientation of the data storage devices, and execute one or more data transfer operations between the data storage devices based thereon. For example, in an embodiment, a top surface of the second data storage device 720B may have one or more sensor devices or components and/or one or more sensor target devices and/or components associated therewith, whereas a bottom-facing surface of the data storage device 720A may comprise one or more corresponding sensors and/or sensor target devices or components. Therefore, when the two sides of the respective data storage devices come within a sensing range, such as where the first storage device 720A is placed to rest directly on top of the second data storage device 720B, interpretation of sensor signals may indicate the relative orientation of the data storage devices as being in a stacked orientation, as shown.

The orientation of FIG. 7 may be associated with any desirable or practical data transfer operation(s). For example, in an embodiment, the orientation of FIG. 7, when recognized by one or more sensors/controllers of the data storage device(s), initiates an extended data volume operation between the first and second data storage devices.

Data Transfer Processes

Figure 8:
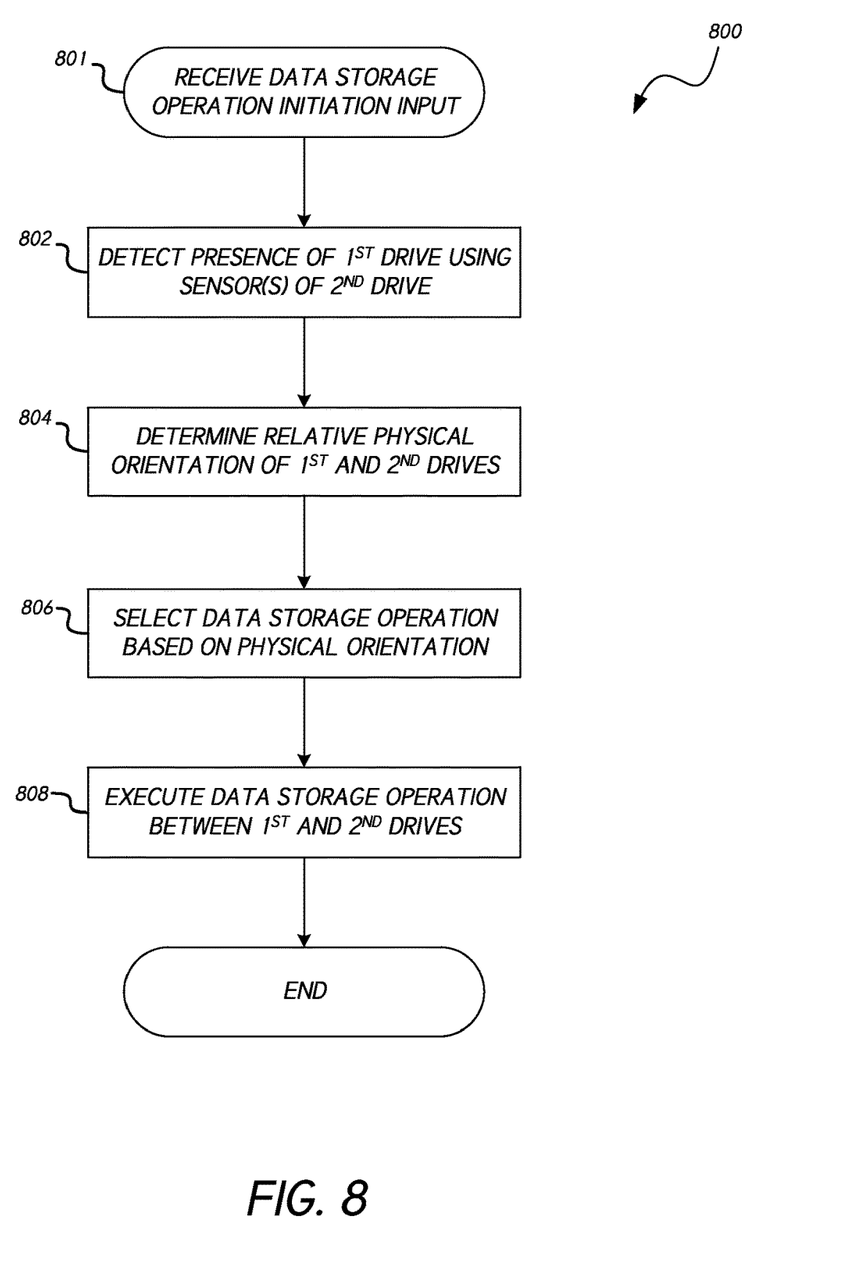
FIG. 8 is a flow diagram illustrating a process for transferring data according to one or more embodiments.

FIG. 8 illustrates a process 800 for performing data transfer operations between a plurality of data storage devices according to one or more embodiments disclosed herein. At block 801, the process 800 involves receiving data storage operation initiation input by a data storage device or one or more components associated therewith or coupled thereto. For example, in one embodiment, a data storage device includes a user input interface for initiating data transfer operations. Such interface may have any desirable or practical configuration or design. For example, in certain embodiments, the data storage device comprises a pushbutton, switch, or other mechanical mechanism that may be triggered by the user to initiate drive transfer operations.

At block 802, the process 800 involves detecting the presence of a first data storage drive using one or more sensors of a second data storage drive. For example, the second storage drive may comprise one or more sensors disposed on or within a housing of the data storage drive, wherein such sensor(s) are configured to detect the presence of one or more sensor target components or devices disposed on or within a housing of the first data storage drive, as disclosed herein.

At block 804, the process 800 involves determining a relative physical orientation of the first and second data storage devices based at least in part on the detection of the first drive by the one or more sensors of the second drive. At block 806, the process 800 involve selecting a data storage operation to execute between the first and second data storage drives based at least in part on the determined physical orientation of the first and second data storage drives. In certain embodiments, a plurality of data transfer operations may be initiated or executed based on the determination of relative physical orientation.

In certain embodiments, certain metadata may be embedded in the sensor target(s) of the first drive that provide identification information, authentication information, or the like. For example, a sensor target may comprise a magnetic field configured to communicate metadata in some manner. In certain embodiments, security information may be transmitted over near-field communication between the first and second data storage drives. In certain embodiments, timing information associated with the detection of the first drive by the second drive may further communicate information.

At block 808, the process 800 involves executing the one or more data storage operations between the first and second data storage drives, the data storage operations having been selected in connection with step 806 described above.

Additional Embodiments

Those skilled in the art will appreciate that in some embodiments, other types of data transfer methods and systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. An external data storage drive comprising:
   a first physical enclosure;
   a host interface for communicatively coupling to a host device separate from the external data storage drive;
   a first non-volatile memory disposed within the first physical enclosure;
   one or more sensors; and
   a controller configured to:
      determine a physical orientation of the external data storage drive relative to another external data storage drive that is separate from the host device using the one or more sensors, the other external data storage drive comprising a second non-volatile memory disposed within a second physical enclosure of the other external data storage drive; and
      in response to the determined physical orientation:
         based on the determined physical orientation, select a type of data storage operation between a copy operation and an extended storage operation; and
         initiate the selected type of data storage operation involving the external data storage drive and the other external data storage drive.

2. The external data storage drive of claim 1, wherein the determined physical orientation of the external data storage drive relative to the other external data storage drive is one of a side-by-side orientation and a stacked orientation.

3. The external data storage drive of claim 1, wherein the one or more sensors comprises a Reed sensor configured to detect a presence of a magnet associated with the other external data storage drive within a detection range of the Reed sensor.

4. The external data storage drive of claim 1, wherein the controller is further configured to access the second non-volatile memory over a wired connection between the external data storage drive and the other external data storage drive.

5. An external data storage drive comprising:
   a first physical enclosure;
   a means for communicatively coupling to a host device separate from the external data storage drive;
   a first non-volatile memory disposed within the first physical enclosure;
   a user input interface associated with the first physical enclosure of the external data storage drive;
   one or more sensors; and
   a controller configured to:
      receive an operation initiation command from the user input interface;
      in response to the operation initiation command, determine a physical orientation of the external data storage drive relative to another external data storage drive comprising a second non-volatile memory disposed within a second physical enclosure of the other external data storage drive;
      determine whether a type of data storage operation associated with the physical orientation is a copy operation or an extended storage operation; and
      initiate the determined type of data storage operation involving the external data storage drive and the other external data storage drive.

6. The external data storage drive of claim 5, wherein the controller is further configured to execute each of a plurality of separate types of data storage operations between the external data storage drive and the other external data storage drive in response to determining separate respective physical device orientations of the external data storage drive relative to the other external data storage drive.

7. The external data storage drive of claim 5, wherein the determined physical orientation is a side-by-side orientation of the external data storage drive relative to the other external data storage drive.

8. The external data storage drive of claim 5, wherein the determined physical orientation is a stacked orientation of the external data storage drive relative to the other external data storage drive.

9. The external data storage drive of claim 5, further comprising one or more magnets associated with the first physical enclosure that are configured to be sensed by a Reed sensor of the other external data storage drive.

10. The external data storage drive of claim 5, wherein:
    the external data storage drive is a network-attached data storage device (NAS); and
    the other external data storage drive is a direct-attached data storage device (DAS).

11. The external data storage drive of claim 5, wherein the means for communicatively coupling to the host device comprises a host interface.

12. A method of managing data storage in a data storage device, the method comprising:
    determining a first relative physical orientation of a first data storage device to a second data storage device using one or more sensors of the first data storage device, the first relative physical orientation being associated with an extended storage operation;

in response to the determined first relative physical orientation, initiating the extended storage operation involving the first data storage device and the second data storage device;

determining a second relative physical orientation of the first data storage device to the second data storage device using the one or more sensors, the second relative physical orientation being associated with a copy operation; and in response to the determined second relative physical orientation, initiating the copy operation between the first data storage device and the second data storage device;

wherein the method is performed at least in part by a controller of the first data storage device.

13. The method of claim 12, wherein the first relative physical orientation is one of a side-by-side orientation and a stacked orientation.

14. The method of claim 12, wherein the one or more sensors comprises a Reed sensor configured to detect a presence of a magnet associated with the other external data storage drive within a detection range of the Reed sensor.

15. The method of claim 12, further comprising accessing a non-volatile memory of the second data storage device over a wired connection between the first data storage device and the second data storage device.

16. The method of claim 12, wherein:

the first data storage device is a network-attached data storage device (NAS); and the second data storage device is a direct-attached data storage device (DAS).

17. The method of claim 12, wherein the first data storage device comprises one or more magnets that are configured to be sensed by a Reed sensor of the second data storage device.

* * * * *